Jan. 11, 1966    L. PÉRAS    3,228,732

SLIDE-BAR MOUNTINGS, NOTABLY FOR VEHICLE SEATS

Filed April 8, 1963

Inventor
Lucien Péras
By Stevens, Davis, Miller & Mosher
Attorneys

United States Patent Office 3,228,732
Patented Jan. 11, 1966

3,228,732
SLIDE-BAR MOUNTINGS, NOTABLY FOR
VEHICLE SEATS
Lucien Péras, Billancourt, France, assignor to Regie
Nationale Des Usines Renault, Billancourt, France
Filed Apr. 8, 1963, Ser. No. 271,297
Claims priority, application France, Apr. 18, 1962,
894,945, Patent 1,328,466
3 Claims. (Cl. 308—3)

This invention relates in general to slide-bar mountings and has specific reference to slide-bar mountings notably for the seats of vehicles.

In vehicle seat slide-bar mountings as a rule the movable slide-bar is retained in a direction opposite to its direction of engagement in the fixed slide-bar by means of a stop screw also adapted to fasten the fixed slide-bar, but in this conventional arrangement the use of a tool is necessary for any slide-bar released operation, for example when it is desired to remove the seats suggested hereinabove by way of example.

More particularly, in a slide-bar mounting this invention provides means for retaining the slide-bars with the assistance of a simple device facilitating and accelerating considerably the slide-bar removal.

To this end the slide-bar mounting according to this invention is characterized essentially in that the retaining device consists of a member pivoted on one of the slide-bars concerned and so disposed that when assembling the slide-bars the free end of said elements is slidably supported by the other slide-bar, said other slide-bar comprising a projecting portion, the free end of said member cooperating with said projecting portion and constituting an upwardly movable stop.

If desired, said projecting portion may consist notably of a fastening element of the relevant slide-bar.

A typical form of embodiment of a mounting according to this invention will now be described by way of example with reference to the accompanying drawing in which.

Figure 1:
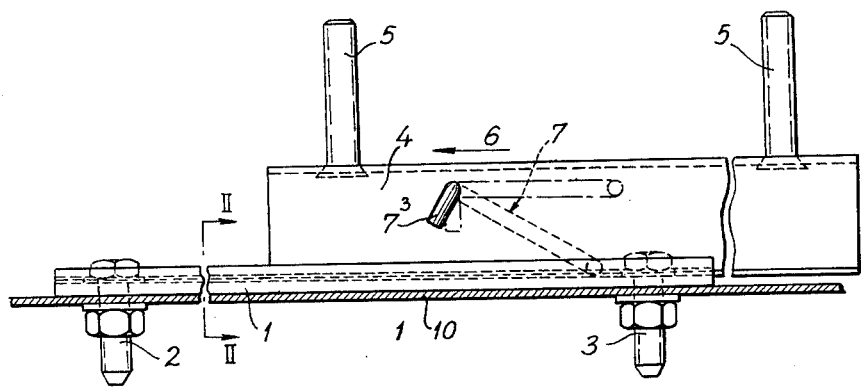
FIGURE 1 is a side elevational view of said slide-bar mounting.
Figure 2:
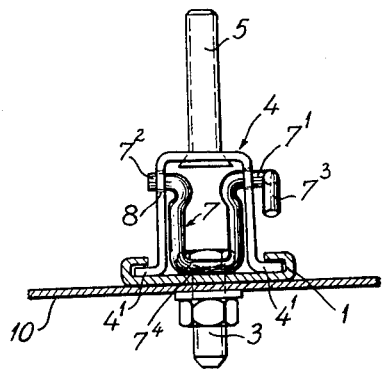
FIGURE 2 is a part elevational and part-sectional view of the same mounting, the section being taken upon the line II—II of FIG. 1.

The slide-bar mounting illustrated in the drawing is described hereinafter in connection with the mounting of an adjustable seat of vehicle which is to constitute a quickly detachable element.

This mounting comprises a lower U-sectioned slide-bar 1 formed with in-turned edges and adapted to be secured on the floor 10 of the vehicle by means of screws 2 and 3 projecting with their heads in the inner channel or race formed by the slide-bar. It further comprises an upper slide-bar 4 consisting of an inverted U section formed with lateral flanges $4^1$ engaging the fixed slide-bar 1. This movable slide-bar 4 carries on its upper portion a pair of parallel screws 5 for securing the seat frame (not shown). The direction of mounting of the slide-bars is designated by the arrow 6 corresponding to the engagement of the seat toward the front end of the vehicle. Mounted in the upper slide-bar 4 is a retaining member 7 for preventing, in conjunction with the head of screw 3, the release of the slide-bars in the direction opposite to the arrow 6.

This retaining member 7 consists of a U-bent metal wire having the outer ends of its arms formed with lateral extensions $7^1$, $7^2$ engaging diametrally opposite orifices 8 formed in the side walls of the movable slide-bar 4. Thus, the extensions $7^1$, $7^2$ constitute the pivot pins of element 7. On the other hand, the extension $7^1$ is also bent to constitute an external crank $7^3$ permitting the easy operation of the retaining member 7. The retaining member 7 is threaded through the upper slide-bar by firstly engaging the portions $7^3$ and $7^1$ through the relevant orifice of the slide-bar, and finally engaging the extension $7^2$ through the opposite hole by taking advantage of the flexibility of the arms of said U-shaped member 7.

This member 7 is so dimensioned that when assembling the slide-bars its base $7^4$ bears by gravity on, and is in sliding engagement with, the lower slide-bar 1, so that it can clear the head of screw 3 without difficulty when the slide-bar 4 is engaged in and moved along the other slide-bar in the direction of the arrow 6. But then any movement of slide-bar 4 in a direction opposite to the arrow 6 is limited automatically when the base $7^4$ of member 7 abuts against the head of screw 3. Thus, member 7 constitutes a releasable stop member adapted to be lifted by means of the crank $7^3$ when it is desired to remove the seat from the vehicle. As conventional in adjustable seat mountings the fixed slide-bar 1 may comprise a plurality of notches formed along its edge, these notches being engageable by a controllable device connected to the seat, the retaining member 7 preventing automatically in this case any untimely release of the slide-bars during the backward movement of the seat, that is, in the direction opposite to the arrow 6.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

I claim:
1. A slide-bar assembly for vehicle seats comprising a support member, a fixed slide bar mounted on said support member, a movable slide bar positioned above and resting on said fixed slide bar and slidable in one direction with respect thereto, a retaining member pivotally mounted on said movable slide bar and having a free end resting in sliding engagement with said fixed slide bar, stop means on said fixed slide bar engageable with said free end of the retaining member upon movement of said movable slide bar in a direction opposite from said one direction to retain said movable slide bar, said stop means including means mounting said fixed bar relative to said support member, said retaining member being provided with handle means for lifting said free end of said retaining member clear of said stop means.

2. The combination of claim 1, wherein said movable slide-bar consists of an elongated member having the shape of an inverted U in lateral cross section, said elongated member having lateral flanges extending from the ends of the branches of the U for slidably engaging said fixed slide-bar and said retaining member consists of a U-shaped metal wire having lateral extensions from the outer ends of its branches.

3. The combination of claim 2, wherein said handle means comprises a crank portion formed on the end of one of said lateral extensions.

(References on following page)

References Cited by the Examiner

UNITED STATES PATENTS

| | | | |
|---|---|---|---|
| 1,569,010 | 1/1926 | Geimer | 312—348 |
| 2,514,704 | 7/1950 | Lantz | 312—333 |
| 2,599,865 | 6/1952 | Rudman | 312—333 X |

FOREIGN PATENTS

| | | |
|---|---|---|
| 308,862 | 4/1929 | Great Britain. |
| 374,462 | 6/1932 | Great Britain. |

DON A. WAITE, *Primary Examiner.*

ROBERT C. RIORDON, FRANK SUSKO, *Examiners.*